(12) United States Patent
Tatebayashi et al.

(10) Patent No.: US 8,593,111 B2
(45) Date of Patent: Nov. 26, 2013

(54) ASSEMBLED BATTERY SYSTEM

(75) Inventors: Yoshinao Tatebayashi, Yokohama (JP); Tetsuro Itakura, Tokyo (JP); Nobuo Shibuya, Hiratsuka (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 647 days.

(21) Appl. No.: 12/559,072

(22) Filed: Sep. 14, 2009

(65) Prior Publication Data

US 2010/0072950 A1    Mar. 25, 2010

(30) Foreign Application Priority Data

Sep. 25, 2008  (JP) .................................. 2008-246447

(51) Int. Cl.
*H02J 7/00*   (2006.01)

(52) U.S. Cl.
USPC .......................................... 320/134; 320/128

(58) Field of Classification Search
USPC .......................................................... 320/134
See application file for complete search history.

(56) References Cited

U.S. PATENT DOCUMENTS 5,898,239 A * 4/1999 Kawam ........................ 320/134
6,531,846 B1 * 3/2003 Smith ............................ 320/134

FOREIGN PATENT DOCUMENTS

| JP | 10-136581 A | 5/1998 |
|---|---|---|
| JP | 2001-352666 | 12/2001 |
| JP | 2002-369372 A | 12/2002 |
| JP | 2008-113505 A | 5/2008 |

OTHER PUBLICATIONS

Office Action issued on Jan. 8, 2013, in Japanese patent Application No. 2008-246447 with English translation.

* cited by examiner

*Primary Examiner* — Drew A Dunn
*Assistant Examiner* — Robert Grant
(74) *Attorney, Agent, or Firm* — Oblon, Spivak, McClelland, Maier & Neustadt, L.L.P.

(57) ABSTRACT

In an assembled battery system, parallel battery blocks are connected in series. Each of the battery blocks includes battery unit modules connected in parallel, and each of the modules includes a battery unit and a fuse connected in series. The battery block is provided with a common connection line connected to a fuse monitoring module, and MOS-FETs each having a gate, source and drain, wherein the fuse is connected between the gate and source, and the drain is connected to the connection line. The FET is turned on and a voltage is applied to the connection line through the FET from the battery unit, when the fuse is blown out. Thus, the fuse monitoring module can detects the blowout of the fuse, and a control module can turn off a control switch to stop charging/discharging of the assembled battery in accordance with the control signal from the fuse monitoring module.

9 Claims, 4 Drawing Sheets

ASSEMBLED BATTERY SYSTEM

CROSS-REFERENCE TO RELATED APPLICATIONS

This application is based upon and claims the benefit of priority from prior Japanese Patent Application No. 2008-246447, filed Sep. 25, 2008, the entire contents of which are incorporated herein by reference.

BACKGROUND OF THE INVENTION

1. Field of the Invention

The present invention relates to an assembled battery system provided with a plurality of secondary batteries and, more particularly, to an assembled battery system having an improved safety circuit configuration which protects the system even if an abnormality such as internal short circuit is occurred in the secondary batteries.

2. Description of the Related Art

Recently, a secondary battery having high-energy density is developed and is utilized as a power source for a small-sized information apparatus such as a cellular phone, notebook-sized personal computer, and the like. Such a secondary battery is utilized in some cases as an assembled battery or a packed battery in which secondary batteries are connected in series or in parallel in accordance with a voltage and current necessary for the apparatus to which the battery is applied. Heretofore, in most of small-sized information apparatuses, a battery is provided with one secondary battery or not more than three secondary batteries which are connected in series.

However, in recent years, the use of the secondary battery is not limited to the information apparatus, and is now rapidly extending in an application of high power output or high voltage such as household electrical appliance, power tool, power-assisted bicycle, hybrid vehicle, and the like. Concomitantly with the use of the secondary battery in the wide field described above, the amount of energy required of the whole assembled battery is also increased.

Basically, the battery capacity of the assembled battery using secondary batteries can be arbitrarily designed for such a requirement. Hence, it is possible to cope with an increase in the required voltage by increasing the number of secondary batteries to be connected in series to secure the required voltage. It is also possible to cope with an increase in the required capacity by increasing the battery capacity of the secondary battery itself to meet the requirement. However, there is a limit to the increasing of the battery capacity of the secondary battery, and thus there is a case where it is necessary to connect the secondary batteries in parallel, or a case where it is desirable that the secondary batteries be connected in parallel. The former case corresponds to a case where the required capacity is enormous, and a single battery can hardly realize the required capacity as in the case of electric power storage. Further, in the latter case, it is difficult to secure the safety by using large capacity batteries in some cases.

In general, as the capacity of the battery increases, it becomes difficult for the battery to radiate heat, whereby the battery becomes subject to a temperature rise. Further, it is known that when a failure that causes the energy of the battery to be concentrated at a part such as an internal short circuit occurs, the safety is lowered. Thus, it is thought desirable that a plurality of battery units for which necessary safety is secured are connected in series, in parallel, or in series-parallel to obtain a necessary capacity.

Here, in an assembled battery including both the parallel connection and series connection, there are basically two types of connection methods. One is a parallel/series connection circuit configuration in which a plurality of battery units are first connected in parallel to form a block, and then a plurality of such blocks are connected in series to constitute an assembled battery. The other is a series/parallel connection circuit configuration in which a plurality of battery units are first connected in series to form a block, and then a plurality of such blocks are connected in parallel to constitute an assembled battery. Further, there is a case where a plurality of series connection blocks and parallel connection blocks are combined with each other in multiple stages such as a connection of series/parallel/series . . . , and the like. However, in such a case, it is seen that the connection includes one of the above two types or both by paying attention to a part of the connection.

Further, in the former parallel/series connection circuit configuration, the parallel battery block can be considered as one battery in view of a battery voltage, and hence battery voltage measurement can be achieved by only measuring the voltage for the number of series connections, thereby offering an advantage that the protection circuit can be made relatively simple. In the parallel/series connection circuit configuration, on the other side, when a fault such as an internal short circuit or the like occurs in one of batteries constituting the parallel battery block, not only energy of the battery unit, but also energy of the other batteries in the same parallel battery block is concentrated at the short-circuited part, and generation of heat is enhanced, whereby there is the strong possibility of the generation of heat being led to combustion or explosion. That is, in the parallel/series connection circuit configuration, there is a state of a configuration similar to the configuration in which larger battery units each of which corresponds to the number of the parallel-connected batteries are used. On the other hand, in the latter series/parallel connection circuit configuration, even when a fault such as an internal short circuit or the like occurs in one of battery units of the series block, the current to be supplied to the series block from outside the series block is supplied to the defective battery while the other batteries in the same series block to which the defective battery belongs are charged by the current, and hence the degree of concentration of energy is less than the case of the parallel/series connection, and the degree of safety is also higher. However, in the series/parallel connection circuit configuration, each of all the battery units constituting the assembled battery can take an independent voltage, and hence in order to prevent overcharging or over-discharging resulting from variation in the unit-battery voltage, it is necessary to monitor voltages of all the battery units, thereby posing a problem that the configuration of the protection circuit is made complicated. Further, in the series/parallel connection circuit configuration, the number of voltage measurement lines is increased, which is not desirable in view of the reliability of the overall assembled battery.

As a method for avoiding both the problems, there is a method disclosed in JP-A 2001-352666 (KOKAI), in which a fuse is used as a protection device of the secondary battery. In the assembled battery system using such a fuse, in the above-mentioned former parallel/series connection circuit configuration, a parallel battery block in which each battery unit and a fuse are connected in series is formed, and the parallel battery blocks are connected in series to constitute an assembled battery. According to the circuit configuration, even when a fault such as an internal short circuit occurs in one battery unit constituting the parallel battery block, the fuse blows out at a time point at which a short-circuit current flows from the other battery unit in the same parallel battery block to the short-circuit part. Accordingly, in the short-circuit battery itself, the same safety as the single internal short circuit can be secured.

When the fuse blows out as described above, regarding the overall assembled battery, when the assembled battery is constituted of only the parallel connections, the short-circuit battery is isolated, and only the capacity of the assembled battery is reduced, whereby the possibility of a serious problem being caused is eliminated.

However, in an assembled battery in which parallel battery blocks are further connected in series, the parallel battery block in which a fuse blows out, and the capacity is largely lowered is liable to be brought into an overcharged or overdischarged state that is a dangerous state. Accordingly, in an assembled battery having the circuit configuration described above, it is important to detect the blowout of the fuse, and, when the fuse blows out, stop or limit the charging or discharging of the assembled battery. However, even when the short-circuit battery is isolated from the assembled battery by the blowout of the fuse, the protection circuit controlling the assembled battery measures voltages of the other normal battery units in the block including the short-circuit battery, and hence there is the problem that it becomes difficult to detect the abnormality of the fuse blowout.

BRIEF SUMMARY OF THE INVENTION

According to an aspect of the present invention, there is provided an assembled battery system comprising:

an assembled battery including battery blocks connected in series, wherein each of the battery blocks includes battery unit modules connected in parallel, each of the battery unit modules includes a series circuit of a chargeable battery unit and a fuse, each of the battery blocks further includes monitoring elements each of which is connected to the fuse so as to detect a blowout of the fuse;

monitoring module which is connected to the respective battery blocks to monitor the monitoring elements in the respective battery blocks, wherein a blowout detecting signal is generated from the monitoring element in response to the blowout of the fuse and is supplied to the monitoring module;

a charge/discharge controller which is connected to the assembled battery so as to control a charge electrical power supplied to the assembled battery and/or a discharge electrical power supplied from the assembled battery; and a control module which generate a control signal to the charge/discharge controller on the basis of the blowout detecting signal to control the charge/discharge controller, the charging/discharging of the assembled battery being controlled depending on the control signal.

DETAILED DESCRIPTION OF THE INVENTION

Assembled battery systems according to embodiments of the present invention will be described below with reference to the accompanying drawings.

First Embodiment

Figure 1:
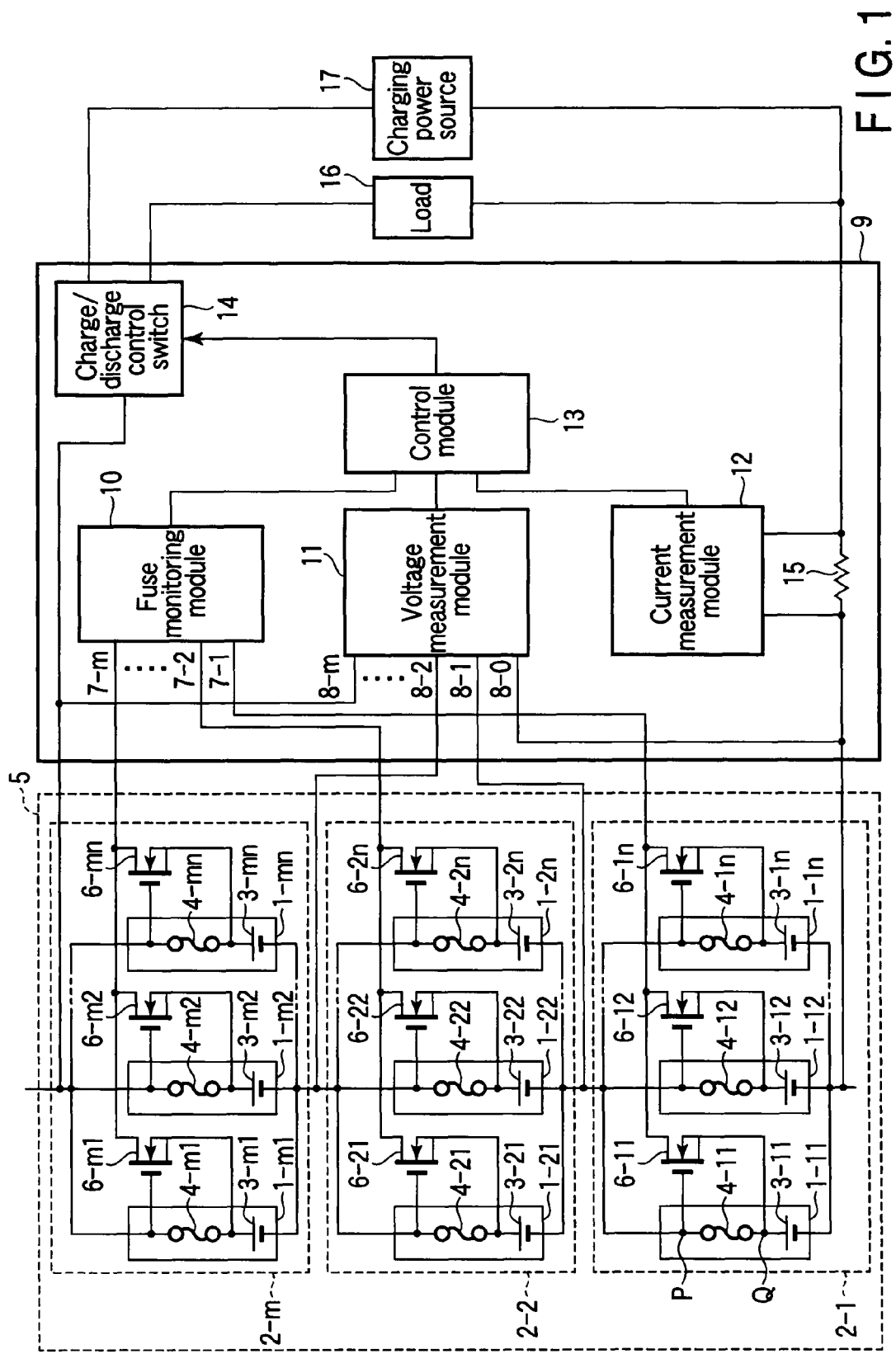
FIG. 1 is a circuit diagram showing a schematic configuration of an assembled battery system according to a first embodiment of the present invention.

FIG. 1 shows the schematic configuration of the assembled battery system according to one embodiment of the present invention.

In FIG. 1, reference symbols 1-11, 1-12, . . . , 1-1n surrounded by solid lines denote battery unit modules. Here, a suffix n added to the battery unit module 1-1n indicates the number of unit batteries constituting a parallel battery block. The plurality of battery unit modules 1-11, 1-12, . . . 1-1n are connected in parallel, and constitute a parallel battery block 2-1. In the battery unit module 1-11, a fuse 4-11 is connected in series with the positive-electrode side of the battery unit 3-11. In this battery unit module 1-11, a secondary battery such as a lithium-ion battery or the like is used as the battery unit 3-11, and a current fuse which blows out at a predetermined current is used as the fuse 4-11.

The same is true of the other battery unit modules 1-12, . . . , 1-1n; in the battery unit module 1-12, a battery unit 3-12 and a fuse 4-12 are connected in series, and in the battery unit module 1-1n, a battery unit 3-1n and a fuse 4-1n are connected in series.

Further, with such a parallel battery block 2-1, a plurality of parallel battery blocks 2-2, . . . , 2-m are connected in series to thereby constitute an assembled battery 5 which is so called as a packed battery or battery assembly. Here, a reference symbol m denotes the number of parallel battery blocks constituting the assembled battery. Each of these parallel battery blocks 2-2, . . . , 2-m is configured in the same manner as the parallel battery block 2-1. In the assembled battery 5, the parallel battery block 2-2 includes battery unit modules having reference symbols formed by adding suffixes 21, . . . , 2n to a reference symbol 1. These battery unit modules 1-21, . . . , 1-2n include battery units having reference symbols formed by adding suffixes 21, . . . , 2n to a reference symbol 3, and fuses having reference symbols formed by adding suffixes 21, . . . , 2n to a reference symbol 4. Further, the parallel battery block 2-m includes battery unit modules having reference symbols formed by adding suffixes m1, . . . , mn to a reference symbol 1. These battery unit modules 1-m1, . . . , 1-mn include battery units having reference symbols formed by adding suffixes m1, . . . , mn to a reference symbol 3, and fuses having reference symbols formed by adding suffixes m1, mn to a reference symbol 4.

A plurality of n-channel type MOS-FETs 6-11 to 6-1n are each connected to fuses 4-11 to 4-1n of the battery unit modules 1-11 to 1-1n constituting the parallel battery block 2-1 as monitoring elements for monitoring the fuses. Each of these n-channel type MOS-FETs 6-11 to 6-1n is turned on by the fuse blowout, and the operation state is changed. At the time of a change in the operation state, a source of the MOS-FET 6-11 is connected to the battery side Q (positive-electrode side of the battery unit 3-11) of the fuse 4-11, a gate thereof is connected to the load side P (opposite side of the battery unit 3-11) of the fuse 4-11. The same is true of the other MOS-FETs 6-12 to 6-1n. Further, drains of these MOS-FETs 6-11 to 6-1n are connected to each other to form a common connection point, and a fuse monitoring line 7-1 is led from this connection point and is connected to a fuse monitoring module 10 of a protection circuit 9. Details of the fuse monitoring module 10 will be described later.

The configurations of the other parallel battery blocks 2-2 to 2-*m* are the same as the parallel battery block 2-1; to the fuses 4-21 to 4-2*n* of the battery unit modules 1-21 to 1-2*n* constituting the parallel battery block 2-2, n-channel type MOS-FETs 6-21 to 6-2*n* are connected as monitoring elements for monitoring the fuses, and to the fuses 4-*m*1 to 4-*mn* of the battery unit modules 1-m1 to 1-*mn* constituting the parallel battery block 2-*m*, n-channel type MOS-FETs 6-m1 to 6-*mn* are connected.

Further, drains of the MOS-FETs 6-21 to 6-2*n* are connected to each other to form a common connection point, a fuse monitoring line 7-2 is led from this connection point, drains of the MOS-FETs 6-*m*1 to 6-*mn* are also connected to each other to form a common connection point, a fuse monitoring line 7-*m* is led from this connection point, and these fuse monitoring lines 7-2 to 7-*m* are also each connected to the fuse monitoring module 10 of the protection circuit 9.

Further, to both ends of the parallel battery blocks 2-1 to 2-*m*, battery voltage measurement lines 8-0, 8-1, to 8-*m* are connected. These battery voltage measurement lines 8-0, 8-1, to 8-*m* are connected to a measurement module 11 of the protection circuit 9 for measuring the voltages of the battery units. Details of the voltage measurement module 11 will be described later.

On the other hand, the protection circuit 9 includes the fuse monitoring module 10, the voltage measurement module 11, a module 12 for measuring a current, a control module 13, a charge/discharge control switch 14 for controlling charging/discharging, and a current detection resistance 15.

The fuse monitoring module 10 monitors a change in the state of each of the MOS-FETs 6-11 to 6-*mn*, and detects the blowout of the fuses 4-11 to 4-*mn*. To the fuse monitoring module 10, the fuse monitoring lines 7-1 to 7-*m* led from the parallel battery blocks 2-1 to 2-*m* are connected, the fuse blowout is monitored for each of the parallel battery blocks 2-1 to 2-*m* through the fuse monitoring lines 7-1 to 7-*m*, and when the fuse blowout is detected, the detection signal is transmitted to the control module 13. That is, the fuse monitoring module 10 detects a change in the state of one of the MOS-FETs 6-11 to 6-*mn* corresponding to a blown fuse of the fuses 4-11 to 4-*mn* concomitant with a turn-on operation of the corresponding one of MOS-FETs 6-11 to 6-*mn*, from a current flowing through each of the fuse monitoring lines 7-1 to 7-*m*, and detects the fuse blowout.

To the voltage measurement module 11, voltage measurement lines 8-0 to 8-*m* for measuring the voltages of the battery units corresponding to the parallel battery blocks 2-1 to 2-*m* are connected, the module 11 measures the terminal voltages, i.e., the battery unit voltages of the parallel battery blocks 2-1 to 2-*m*, and transmits measurement signals to the control module 13. The current measurement module 12 measures a current flowing through the current detection resistance 15 connected in series with the assembled battery 5, i.e., a current flowing through the overall assembled battery 5, and a measurement signal is transmitted to the control module 13.

The charge/discharge control switch 14 is connected in series with the assembled battery 5, and is turned on/off in accordance with the instruction of the control module 13. In this case, a load 16 and a charging power source 17 are connected to the charge/discharge control switch 14, and the switch 14 controls permission of discharging the power from the assembled battery 5 to the load 16, and permission or inhibition of charging of the assembled battery 5 by the charging power source 17.

Figure 2:
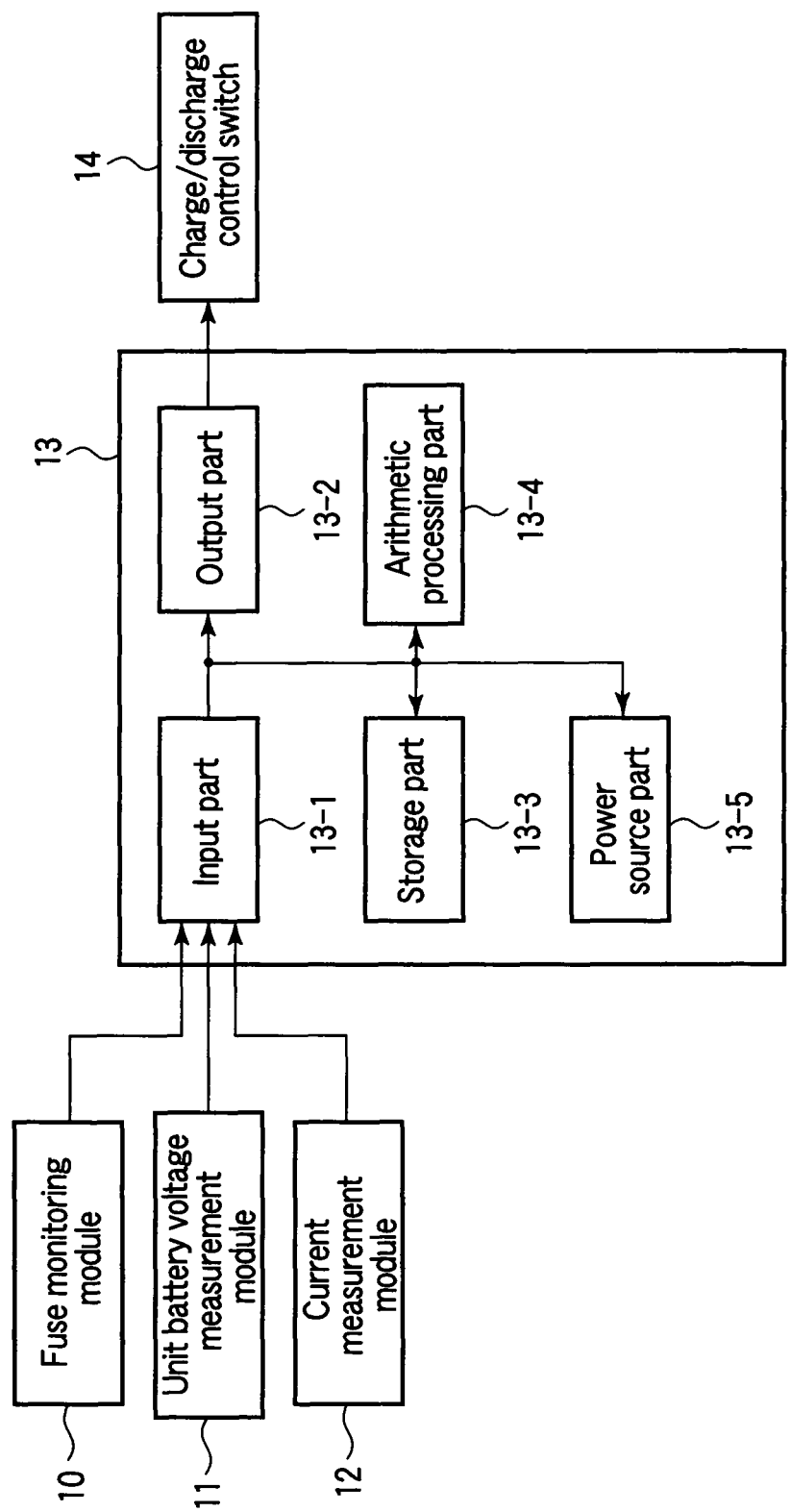
FIG. 2 is a view showing the schematic configuration of a control module shown in FIG. 1.

As shown in FIG. 2, the control module 13 includes an input part 13-1, output part 13-2, storage part 13-3, arithmetic processing part 13-4, and power source part 13-5. As the arithmetic processing part 13-4, a central processing unit (CPU) can be used, and as the storage part 13-3, a universal memory or the like can be used. The control module 13 processes information in the arithmetic processing part 13-4 on the basis of information input from the fuse monitoring module 10, voltage measurement module 11, and current measurement module 12 to the input part 13-1, and information stored in advance in the storage part 13-3, and gives an instruction from the output part 13-2 to the charge/discharge control switch 14 for controlling the charging/discharging on the basis of the arithmetic processing result, thereby controlling the turning-on/off operation of the charge/discharge control switch 14. Upon receipt of detection information of a fuse blowout from the fuse monitoring module 10, the control module 13 forcibly turns off the charge/discharge control switch 14 to totally inhibit discharging of power from the assembled battery 5 to the load 16, and charging of the assembled battery 5 by the charging power source 17. Further, when it is detected that part of the parallel battery blocks 2-1 to 2-*n* have reached an overcharge voltage or an over-discharge voltage from the measurement result of the voltage measurement module 11, or also when an over-current flowing through the current detection resistance 15 is detected from the measurement result of the current measurement module 12, the control module 13 can forcibly turn off the charge/discharge control switch 14 to totally inhibit discharging of power from the assembled battery 5 to the load 16, and charging of the assembled battery 5 by the charging power source 17. For example, it is possible to perform the control by storing such a control method in the storage part 13-3 in advance, and appropriately referring to the control method by means of the arithmetic processing part 13-4.

Next, an operation of the assembled battery system of the embodiment configured as described above will be described below.

Now, when the overall assembled battery 5 operates normally, all the fuses 4-11 to 4-*mn* of the parallel battery blocks 2-1 to 2-*m* are normal, and in the conduction state. Even when the assembled battery 5 is subjected to charging/discharging, voltages generated across both ends of all the fuses 4-11 to 4-*mn* are very small, and gate-source voltages of all the MOS-FETs 6-11 to 6-*mn* connected to these fuses 4-11 to 4-*mn* are also very small, and hence the drain-source parts of the MOS-FETs 6-11 to 6-*mn* are kept in an off-state.

When an internal short circuit has occurred in one of the battery units 3-11 to 3-*mn* constituting the assembled battery 5 in this state, if, for example, the internal short circuit has occurred in the battery unit 3-11, and if the short-circuit current is sufficiently small, the fuse 4-11 does not blow out. In this case, there is little possibility of a dangerous phenomenon occurring such as heat generation, thermal runaway or the like of the battery unit 3-11. However, if an insulating member inside the battery such as a separator or the like is damaged by the internal short circuit of the battery unit 3-11, and the short-circuit current is further increased, the terminal voltage of the battery unit 3-11 is lowered, a voltage difference between the battery unit 3-11 itself and the other battery units 3-12 to 3-1*n* constituting the same parallel battery block 2-1 becomes larger, and these battery units 3-12 to 3-1*n* are discharged through the short-circuited battery unit 3-11 at a large current. As a result of this, a large current exceeding the rated current value flows through the fuse 4-11 connected in series with the battery unit 3-11, and the fuse 4-11 blows out.

It should be noted that, also when a fault other than the internal short circuit occurs, such as a partial short circuit caused by a metallic foreign matter or the like that has entered the inside of the assembled battery system, and is brought into contact with or is made rubbed against a terminal of the battery unit or a connection wire, a fuse connected to a battery unit of the short-circuited part blows out.

As described above, when an internal short circuit occurs in the battery unit 3-11, and the fuse 4-11 blows out, the terminal potential of the fuse 4-11 on the battery side (on the positive-electrode side of the battery unit 3-11) becomes substantially equal to the negative-electrode side potential of the parallel battery block 2-1. On the other hand, the terminal potential on the load side (opposite side of the battery unit 3-11) becomes substantially equal to the positive-electrode side potential of the parallel battery block 2-1. As a result of this, the gate-source voltage of the MOS-FET 6-11 becomes equal to the positive electrode-negative electrode voltage of the parallel battery block 2-1, and hence the drain-source part is turned on. Then, by being turned on of the MOS-FET 6-11, a current flows from the fuse monitoring module 10 through the fuse monitoring line 7-1. At this time, the fuse monitoring module 10 detects the current flowing through the fuse monitoring line 7-1 to detect the blowout of the fuse 4-11, and notifies the fact to the control module 13.

Upon receipt of the fuse blowout detection information from the fuse monitoring module 10, the control module 13 forcibly turns off the charge/discharge control switch 14. As a result of this, the assembled battery 5 is disconnected from the load 16 and the charging power source 17, and discharging of power from the assembled battery 5 to the load 16, and charging of the assembled battery 5 by the charging power source 17 are totally inhibited. That is, when it is determined that at least one of the fuses 4-11 to 4-*mn* provided to correspond to the battery units 3-11 to 3-*mn* has blown out, charging/discharging of the assembled battery 5 is totally inhibited, and the operations of the overall assembled battery system are stopped, whereby a high degree of safety is secured as the system.

It should be noted that the above-mentioned operations are made further more stable by satisfying the following conditions. That is, as described above, when the assembled battery is normal, to the part between the gate and source of each of the MOS-FETs 6-11 to 6-*mn*, the voltage across the corresponding one of the fuses 4-11 to 4-*mn* is applied. At this time, even when the fuses 4-11 to 4-*mn* are in the normal state, in order that the MOS-FETs 6-11 to 6-*mn* may maintain the off-state, it is desirable that the gate-source voltage at which the MOS-FET 6-11 to 6-*mn* is turned on be higher than the voltage between terminals of the fuse calculated by multiplying the resistance between the terminals of the fuse 4-11 to 4-*mn* by the rated current. Further, when the fuse 4-11 to 4-*mn* is cut off, the gate-source voltage of the MOS-FET 6-11 to 6-*mn* becomes substantially equal to the positive-electrode potential of the parallel battery block 2-1 to 2-*m*, and hence in order that the MOS-FET 6-11 to 6-*mn* may become securely in the on-state irrespectively of the charge status of the assembled battery 5, it is desirable that the gate-source voltage at which the MOS-FET 6-11 to 6-*mn* is turned on be smaller than the discharge cutoff voltage determined in advance for the battery unit 3-11 to 3-*mn*.

Here, the discharge cutoff voltage implies the voltage lower limit value of the parallel battery block for allowing the assembled battery system to be discharged, and can be arbitrarily determined within a range in which the battery units constituting the parallel battery block are hardly deteriorated, or a range in which the battery units do not become unsafe. When a voltage of at least one of the parallel battery blocks constituting the assembled battery becomes lower than the discharge cutoff voltage, the control module turns off the charge/discharge control switch to stop the discharge, and hence while the assembled battery system is operated, the voltages of all the parallel battery blocks are maintained higher than the discharge cutoff voltage.

In an assembled battery 5 formed by connecting, in series, a plurality of parallel battery blocks configured by connecting, in parallel, a plurality of battery unit modules formed by connecting, in series, a battery unit 3-11 (3-12 to 3-*mn*) and a fuse 4-11 (4-12 to 4-*mn*), an n-channel type MOS-FET 6-11 to 6-*mn* a gate and source of which are connected to both terminals of a fuse 4-11 (4-12 to 4-*mn*), and a drain of which is connected to drains of the other MOS-FETs in the same parallel battery block to form a common connection point, is provided in each battery unit module, and a change in the state of the MOS-FET 6-11 to 6-*mn* concomitant with the turn-on operation of the MOS-FET 6-11 to 6-*mn* is monitored by the fuse monitoring module 10 through a fuse monitoring line 7-1 to 7-*m* led from the drain of the MOS-FET 6-11 to 6-*mn* connected to the common connection point. Here, when the fuse monitoring module 10 detects a fuse blowout, the control module 13 turns off the charge/discharge control switch 14 to stop the charging/discharging of the assembled battery 5. When at least one of the fuses 4-11 to 4-*mn* provided to correspond to the battery units 3-11 to 3-*mn* has blown out, it is possible to totally inhibit the charging/discharging of the assembled battery 5, and stop the operations of the entire assembled battery system, and hence it is possible, even when an abnormality occurs in part of the battery units, to secure a high degree of safety as the system. That is, in the case of an assembled battery formed by connecting, in series, parallel battery blocks each of which is formed by connecting a plurality of battery unit modules in parallel, when one of fuses provided for the respective battery units blows out, and the capacity of the parallel battery block is largely lowered, the parallel battery block is brought into an overcharged or over-discharged state, whereby a very dangerous state is brought about in some cases. However, in such a case, it is possible to totally inhibit the charging/discharging of the assembled battery 5, and stop the operations of the overall assembled battery system, and hence it is possible to secure a high degree of safety as the assembled battery system.

Further, a change in the state of the MOS-FET 6-11 to 6-*mn* concomitant with the turn-on operation thereof is monitored through the fuse monitoring line 7-1 to 7-*m* for each parallel battery block 2-1 to 2-*m*, and hence it is possible to minimize the number of the fuse monitoring lines, and simplify the wiring between the assembled battery 5 and the protection circuit 9, whereby it is possible to eliminate erroneous wiring, and simplify the assembling work.

Modification Example

In the assembled battery system of the first embodiment described above, the entire assembled battery system is monitored by means of m pieces of fuse monitoring lines 7-1 to 7-*m*, and m+1 pieces of battery voltage measurement lines 8-0 to 8-*m*. However, if it is assumed that the MOS-FETs 6-11 to 6-*mn* are arranged at a position separate from the fuses 4-11 to 4-*mn*, e.g., a position on the protection circuit 9 side, a vast quantity of fuse monitoring wires of m×n×2 pieces are separately required between the MOS-FETs 6-11 to 6-*mn* and the fuses 4-11 to 4-*mn*, whereby arrangement or the like of the wiring is made complicated to easily bring about erroneous wiring, and the assembling work becomes troublesome in some cases.

Figure 3:
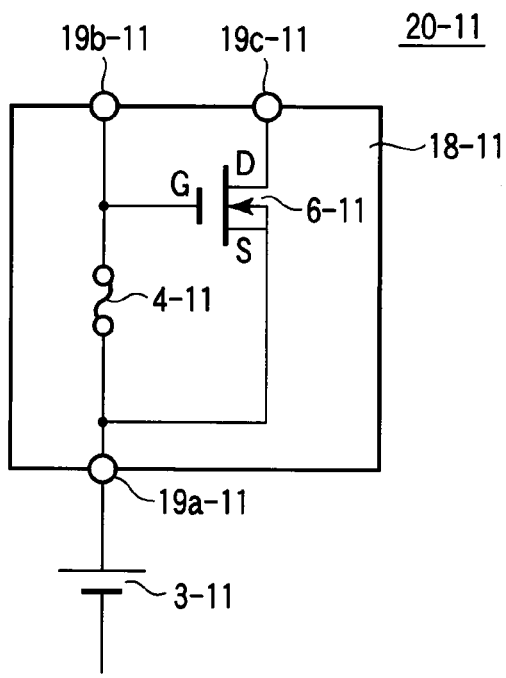
FIG. 3 is a view showing the schematic configuration of a protection unit used in the first embodiment.
Figure 4:
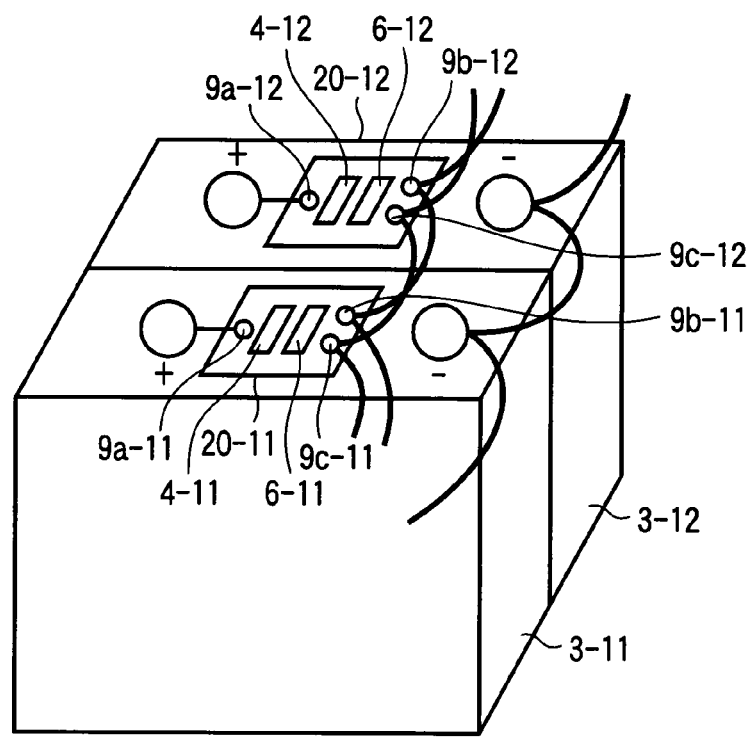
FIG. 4 is a view for explaining a connection method in a parallel battery block of the protection unit used in the first embodiment.

Accordingly, it is desirable that both the MOS-FETs 6-11 to 6-*mn* and the fuses 4-11 to 4-*mn* be arranged in the closest vicinity of the battery units 3-11 to 3-*mn*. It is more desirable that as shown in, for example, FIG. 3, the fuse 4-11 and the MOS-FET 6-11 be arranged on the same board 18-11, the connection point (Q on the battery side) at which the fuse 4-11 and the source of the MOS-FET 6-11 are connected to each other be connected to the first current terminal 19a-11, the connection point (P on the load side) at which the fuse 4-11 and the gate of the MOS-FET 6-11 are connected to each other be connected to the second current terminal 19b-11, further, the drain of the MOS-FET 6-11 be connected to the protection terminal 19c-11 to thereby constitute the above circuit as the protection unit 20-11, and the thus constituted protection unit 20-11 be directly arranged on, and fixed to the surface of the corresponding battery unit 3-11 as shown in FIG. 4.

In such arrangement, regarding the other MOS-FETs 6-12 to 6-mn, and the other fuses 4-12 to 4-mn, protection units 20-12 to 20-mn are configured in the same manner, and are directly arranged and fixed on the surfaces of the corresponding battery units 3-12 to 3-mn.

The configuration is made as described above, in the battery unit 3-11, as shown in FIG. 4, the protection unit 20-11 is arranged and fixed on the surface of the battery unit 3-11, and the first current terminal 19a-11 is connected to the positive-electrode side terminal of the battery unit 3-11. Further, the second current terminal 19b-11 is connected to the second current terminal 19b-12 of the protection unit 20-12 of the next battery unit 3-12 of the same parallel battery block 2-1, thereafter, in the same manner, the second current terminals of the respective battery units are connected together up to the second current terminal 19b-1n of the battery unit 3-1n to thereby form the positive-electrode side current terminal of the parallel battery block 2-1, and this positive-electrode side current terminal is connected to the battery voltage measurement line 8-1. Further, the protection terminal 19c-11 is connected to the protection terminal 19c-12 of the protection unit 20-12 of the next battery unit 3-12 of the same parallel battery block 2-1, thereafter, in the same manner, the protection terminals of the respective battery units are connected together up to the protection terminal 19c-1n of the battery unit 3-1n, and the resultant connection point is connected to the fuse monitoring line 7-1. The same is true of the other parallel battery blocks 2-2 to 2-m.

In the circuit configuration described above, it is possible to simplify the arrangement of the wiring between each battery unit 3-11 to 3-mn and each protection unit 20-11 to 20-mn, and minimize the number of lines of the fuse monitoring lines 7-i to 7-m and the battery voltage measurement lines 8-0 to 8-m, and hence it is possible to eliminate erroneous wiring, improve the reliability of the assembled battery system, and simplify the assembling work.

Second Embodiment

In the first embodiment described above, when it is determined that at least one of the fuses 4-11 to 4-mn provided to correspond to the battery units 3-11 to 3-mn has blown out, the charging/discharging of the assembled battery 5 is totally inhibited. However, even when abnormal one of the battery units 3-11 to 3-mn is isolated from the assembled battery 5 by the blowout of the corresponding one of the fuses 4-11 to 4-mn, all the parallel battery blocks 2-1 to 2-m maintain normal voltages that can be charged or discharged, it is conceivable that the charging/discharging operation itself of the assembled battery is possible. For example, as in the case where the assembled battery system is mounted on an electric vehicle, the fact that even when one of the battery units 3-11 to 3-mn is abnormal, the assembled battery system can still drive the vehicle, leads to better safety for the occupants of the vehicle in some cases. For example, a case can be assumed where for example, when the electric vehicle is running, the assembled battery system supplies electricity to the electric vehicle until the vehicle becomes able to stop safely.

Figure 5:
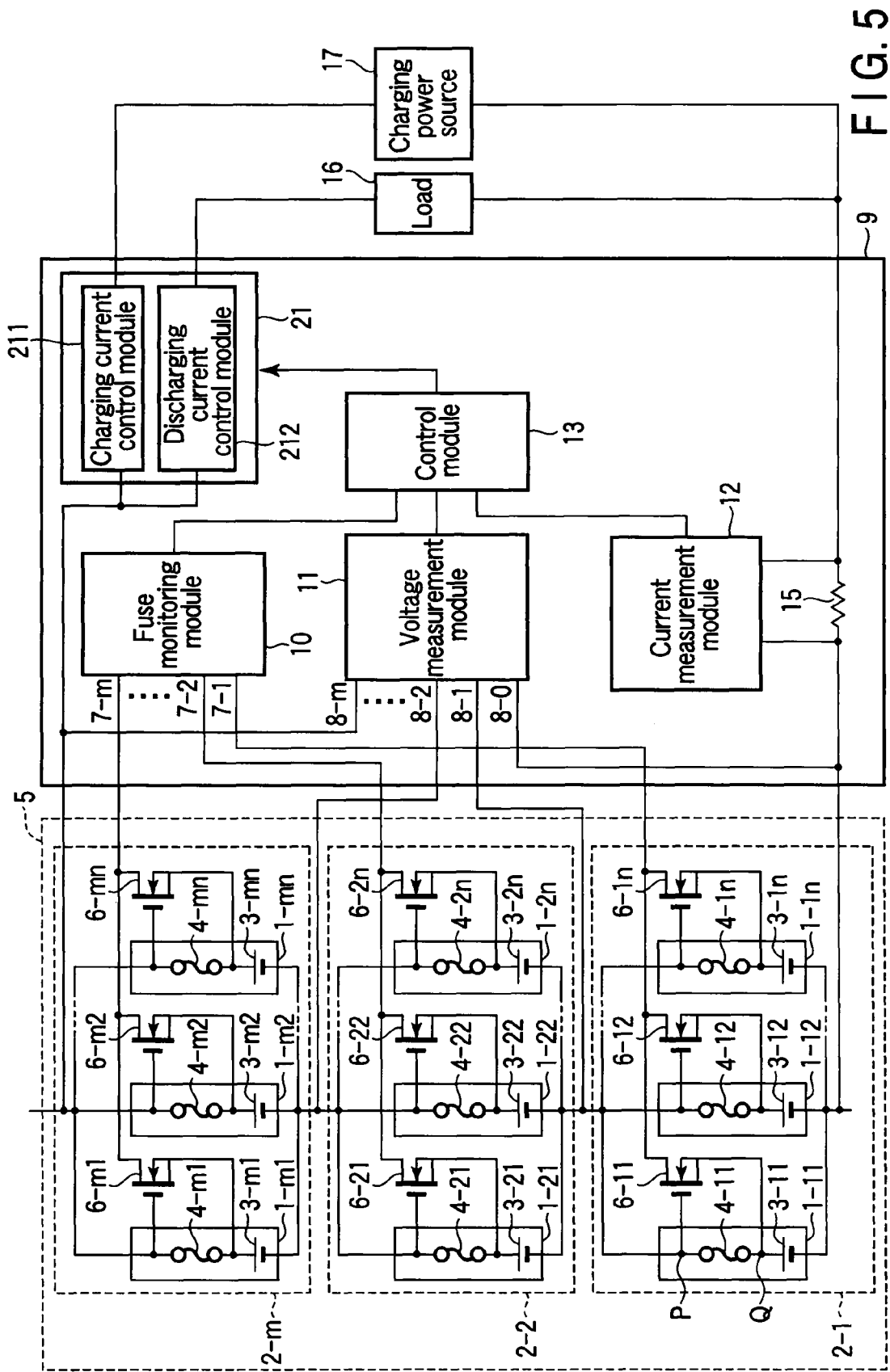
FIG. 5 is a view showing the schematic configuration of an assembled battery system according to a second embodiment of the present invention.

FIG. 5 shows the schematic configuration of an assembled battery system according to a second embodiment, the same parts as those in FIG. 1 are denoted by the same reference symbols, and a description of them will be omitted.

In the assembled battery system shown in FIG. 5, in order to control charging/discharging, a charge/discharge control unit 21 is provided in place of the charge/discharge control switch 14. The charge/discharge control unit 21 includes a charging current control module 211, and a discharging current control module 212. The charging current control module 211 controls a charging current of the assembled battery 5 supplied from a charging power source 17 in accordance with an instruction from a control module 13. The discharging current control module 212 controls a discharging current from the assembled battery 5 to a load 16 in accordance with an instruction from the control module 13.

In this assembled battery system, when at least one of fuses 4-11 to 4-mn corresponding to battery units 3-11 to 3-mn blows out, and detection information of a fuse monitoring module 10 is supplied to the control module 13, the charge/discharge control unit 21 cuts off the charging current supplied from the charging power source 17 to the assembled battery 5 in accordance with an instruction from the control module 13 by means of the charging current control module 211 to stop charging for the entire assembled battery 5, and permits only the discharging current supplied from the assembled battery 5 to the load 16 by means the discharging current control module 212.

In such an operation described above, use of the assembled battery 5 with repetitive charging is inhibited, and a discharging current corresponding to the residual capacity of the assembled battery 5 can be supplied to the load 16, and hence in the case where the assembled battery is mounted on an electric vehicle, it becomes possible, even when one of the battery units 3-11 to 3-mn is abnormal, to continue driving the vehicle, and secure the safety of the occupants.

EXAMPLES

The above-mentioned assembled battery system will be described below in more detail by way of specific examples. Here, it is evident that the present invention is not limited to the following examples as long as the scope of the gist of the present invention is not exceeded.

Example 1

In Example 1, one of fuse terminals is welded to a positive-electrode terminal of a non-aqueous electrolyte secondary battery having a prismatic shape, and having a discharge capacity of 3 ampere-hours to thereby form a battery unit module. Five battery units are arranged in such a manner that side surfaces of the battery units each having the larger areas face each other, and are connected in parallel with each other through fuses to form a parallel battery block. As the fuse, a fuse having a rated current of 30 A, and a DC resistance value of 5 mΩ at the rated current was used. An n-channel type MOS-FET was connected to both terminals of each fuse at a gate and a source thereof as a fuse monitoring element as described previously in connection with FIG. 1, whereby the MOS-FET was arranged integral with the battery unit. Further, the drains of the five MOS-FETs were connected to each other by means of a wire extending along the battery unit modules. The battery unit had a full-charge voltage of 4.2V, and a discharge cutoff voltage of 3.0V and, and the MOS-FET which was turned on at a gate-source voltage of 2.5V was used. Further, four parallel battery blocks each of which was configured as described above were connected in series to form an assembled battery. Unit battery voltage measurement lines were connected from a total of five points including the positive and negative electrodes of the whole assembled battery, and connection points between the parallel battery blocks to a protection circuit 9 described previously in connection with FIG. 1. Further, four fuse monitoring lines were connected to the protection circuit 9. The positive electrode and the negative electrode of the whole assembled battery were also connected to the protection circuit 9, and were further connected to a load 16 and a charging power source 17 through a current detection resistance 15 and a charge/discharge control switch 14 in the protection circuit 9. A fuse monitoring module 10 in the protection circuit 9 was set in such a manner that when the voltage across the fuse exceeded 2.5V, the module 10 detected that a current flowed through the MOS-FET, and a control module 13 was set, at this time, in such a manner that the module 13 turned off the charge/discharge control switch.

Example 2

In this Example 2, as in the case of Example 1, battery unit modules, and parallel battery blocks were connected in sequence, and four parallel battery blocks were connected in series to form an assembled battery. Unit battery voltage measurement lines were connected from a total of five points including the positive and negative electrodes of the whole assembled battery, and connection points between the parallel battery blocks to a protection circuit 9 described previously in connection with FIG. 5. Further, four fuse monitoring lines were connected to the protection circuit 9. The positive electrode and the negative electrode of the whole assembled battery were also connected to the protection circuit 9. The negative electrode was further connected to the negative-electrode side of each of a load 16 and a charging power source 17 through a current detection resistance 15 in the protection circuit 9. The positive electrode was connected to the positive-electrode side of the charging power source 17 through a charging current control module 211 of a charge/discharge control unit 21, and was connected to the positive-electrode side of the load 16 through a discharging current control module 212. A fuse monitoring module 10 in the protection circuit 9 was set in such a manner that when the voltage across the fuse exceeded 2.5V, the module 10 detected that a current flowed through the MOS-FET, a control module 13 was set, at this time, in such a manner that the module 13 cut off the charging current by means of the charging current control module 211 of the charge/discharge control unit 21, and the discharging current control module 212 was set in such that the module 212 was left permitted to discharge the assembled battery.

Comparative Example 1

In Comparative example 1, an assembled battery was manufactured in the same manner as in Example 1, and in this case, the assembled battery was set in a state where an n-channel type MOS-FET was not connected as the fuse monitoring element.

The discharge capacity of each of the assembled batteries of Examples 1 and 2, and Comparative example 1 manufactured in the manner described above at the time of 1 C charging/discharging was measured in an environment of 25° C., and each assembled battery was brought into the SOC 50% state. After that, in order to simulate an internal short circuit in the battery unit, the battery unit 3-21 (see FIGS. 1 and 5) was short-circuited, and after an elapse of one hour, each assembled battery was subjected to the 1 C charging/discharging again. The discharge capacity, maximum value and minimum value of the parallel battery block voltage at the time of charging, maximum value and minimum value of the parallel battery block voltage at the time of discharging each of which is measured before the short-circuiting, state of the fuse at the time of short-circuiting, and discharge capacity, maximum value and minimum value of the parallel battery block voltage at the time of charging, and maximum value and minimum value of the parallel battery block voltage at the time of discharging each of which is measured after the short-circuiting are shown in Table 1 below.

TABLE 1

| | | Example 1 | Example 2 | Comparative Example 1 |
|---|---|---|---|---|
| Before short-circuiting | Discharge capacity (Ah) | 15.1 | 15.2 | 15.2 |
| | Maximum voltage (V) of parallel block at the time of charging | 4.21 | 4.21 | 4.21 |
| | Minimum voltage (V) of parallel block at the time of charging | 4.18 | 4.19 | 4.19 |
| | Maximum voltage (V) of parallel block at the time of discharging | 3.2 | 3.1 | 3.2 |
| | Minimum voltage (V) of parallel block at the time of discharging | 2.9 | 2.9 | 2.8 |
| At the time of short-circuiting | State of fuse 4-21 | Blow out | Blow out | Blow out |
| After short-circuiting | Charging/discharging control state | Charging/discharging inhibited | Charging inhibited/discharging permitted | Discharging permitted |
| | Discharge capacity (Ah) | 0 | 6.5 | 10.5 |

TABLE 1-continued

|  | Example 1 | Example 2 | Comparative Example 1 |
|---|---|---|---|
| Maximum voltage (V) of parallel block at the time of charging | 3.82 | 3.81 | 4.28 |
| Minimum voltage (V) of parallel block at the time of charging | 3.79 | 3.8 | 3.95 |
| Maximum voltage (V) of parallel block at the time of discharging | 3.82 | 3.5 | 3.6 |
| Minimum voltage (V) of parallel block at the time of discharging | 3.79 | 3 | 3 |

According to Table 1, in each of the assembled batteries of Examples 1 and 2, and Comparative example 1, the corresponding fuse 4-21 blew out at the time of short-circuiting, and the short-circuited battery was isolated from the assembled battery. In the assembled battery system of Example 1, charging/discharging was inhibited by the opened state of the charge/discharge control switch 14 after the short-circuiting, and the safety was secured. As for the assembled battery system of Example 2, only charging was inhibited after the short-circuiting, and hence no overcharged parallel battery block occurred, and in the discharging process subsequently performed, a capacity of 6.5 Ah could be discharged although it is smaller than the residual capacity 7.5 Ah at the time of the short-circuiting. On the other hand, in Comparative example 1, although charging/discharging could be performed, the value of the capacity became a value further smaller than a value obtained by subtracting the capacity of the isolated battery from the rated capacity. Further, SOC between the parallel battery blocks became misaligned, and hence the variations between the parallel battery blocks in the voltage enlarged at the terminal stage of the charging and at the terminal stage of the discharging, and an overcharged parallel battery block occurred.

It should be noted that the present invention is not limited to the embodiments described above, and can be variously modified in the implementation stage within the scope not deviating from the gist of the invention. For example, in the embodiments described above, an example in which the fuses 4-11 to 4-mn are connected to the positive-electrode side of the battery units 3-11 to 3-mn are shown, the fuses 4-11 to 4-mn may be connected to the negative-electrode side of the battery units 3-11 to 3-mn. In this case, the MOS-FETs 6-11 to 6-mn are connected to the fuses 4-11 to 4-mn as they are in the same direction. Further, p-channel type MOS-FETs may be used in place of the n-channel type MOS-FETs as the fuse monitoring elements. In this case, it is sufficient if a gate and source are connected in the direction reverse to that of FIG. 1. Further, in the above description, an example in which the MOS-FET is used as the fuse monitoring element has been described. However, anything other than the MOS-FET that changes in the operation state by a blowout of the fuse may be used. For example, a three-terminal element having a switch function may also be used. More specifically, an npn transistor may be used in place of the n-channel type MOS-FET. In this case, it is sufficient if the connection is made by changing the gate to a base, drain to collector, and source to emitter. However, it is necessary to appropriately insert a base resistance in order to prevent a large current from flowing through the base-emitter part of a transistor connected to a cut-off fuse at the time of fuse blowout, or the base-collector part of a transistor connected to a fuse that does not blow out. In addition, regarding the fuse monitoring element, there may be used a device that changes in the operation state by a blowout of the fuse, for example, a device that changes in the impedance thereof at the operation time by a blowout of the fuse.

As has been described above, according to the examples of the present invention, it is possible to provide an assembled battery system that can secure a high degree of safety even when an abnormality occurs in part of the battery units.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An assembled battery system comprising:
an assembled battery including battery blocks connected in series, wherein each of the battery blocks includes a monitoring line and plural battery unit modules, the plural battery unit modules connected in parallel with each other within each battery block, each of the battery unit modules includes a chargeable battery unit connected in series with a fuse, each of the battery blocks further includes monitoring elements each of which includes a MOS-FET having a gate, a drain, and a source, the drain is connected to the monitoring line, and the fuse is connected between the gate and the source;
a monitoring module which is connected to the battery blocks through the respective monitoring lines each of which commonly connects the monitoring elements in the battery block to monitor the monitoring elements in the respective battery blocks, wherein a blowout detecting signal is generated from the monitoring element in response to the blowout of the fuse and the monitoring module detects the blowout detecting signal through the monitoring line;
a charge/discharge controller which is connected to the assembled battery so as to control a charge electrical power supplied to the assembled battery and/or a discharge electrical power supplied from the assembled battery; and
a control module which generates a control signal to the charge/discharge controller on the basis of the blowout detecting signal to control the charge/discharge controller, the charging/discharging of the assembled battery being controlled depending on the control signal.

2. The system according to claim 1, wherein the MOS-FET is turned on to connect the monitoring line to the battery unit depending on the blowout of the fuse, and a voltage is applied as the blowout detecting signal to the monitoring line from the battery unit.

3. The system according to claim 1, wherein the MOS-FET is turned on at a predetermined gate-source voltage which is lower than a discharge cutoff voltage of the battery unit, and is higher than a fuse voltage applied to the fuse, and the fuse voltage is calculated by multiplying a rated current of the fuse by a resistance of the fuse.

4. The system according to claim 1, further comprising a circuit board on which the fuse and the MOS-FET are mounted, wherein the fuse has first and second connection points, the battery unit has electrode terminals, the circuit board is provided with first and second current terminals, and monitoring terminals provided on the monitoring line, the first current terminal is connected to one of the first and second connection points and is also connected to one of the source and gate of the MOS-FET and one of the electrode terminals, the second current terminal is connected to the other of the connection points of the fuse and to the other of the source and gate of the MOS-FET, and the drain of the MOS-FET is connected to one of the monitoring terminals in the parallel battery block.

5. The system according to claim 4, wherein the battery unit has a surface on which the fuse and the MOS-FET are mounted.

6. The system according to claim 1, further comprising a charging power source which supplies the charge electrical power to the assembled battery, wherein the charge/discharge controller includes a control switch which is connected between the assembled battery and the charging power source to control a supply of the charge electrical power in response to the blowout detecting signal.

7. The system according to claim 1, further comprising a load to which the discharge electrical power is supplied from the assembled battery, wherein the charge/discharge controller includes a control switch which is connected between the assembled battery and the load to control the discharge electrical power in response to the blowout detecting signal.

8. The system according to claim 1, further comprising a charging power source which supplies a charging current to the assembled battery, wherein the charge/discharge controller includes a charging current control module which stops the charging current supplied to the assembled battery in response to the blowout detecting signal.

9. The system according to claim 1, further comprising a load to which the discharging current is supplied from the assembled battery, wherein the charge/discharge controller includes a discharging current control module which permits the discharging current supplied from the assembled battery in response to the blowout detecting signal.

* * * * *